(12) United States Patent
Bullerdick et al.

(10) Patent No.: US 8,950,103 B2
(45) Date of Patent: Feb. 10, 2015

(54) DECOY DUNKING APPARATUS

(76) Inventors: Chris A. Bullerdick, Providence, KY (US); Brett M. Jones, Hanson, KY (US)

(*) Notice: Subject to any disclaimer, the term of this patent is extended or adjusted under 35 U.S.C. 154(b) by 777 days.

(21) Appl. No.: 13/135,594

(22) Filed: Jul. 11, 2011

(65) Prior Publication Data
US 2013/0014422 A1  Jan. 17, 2013

(51) Int. Cl.
A01M 31/06 (2006.01)
(52) U.S. Cl.
CPC .................... A01M 31/06 (2013.01)
USPC ...................................... 43/3; 43/2
(58) Field of Classification Search
None
See application file for complete search history.

(56) References Cited

U.S. PATENT DOCUMENTS

| | | | |
|---|---|---|---|
| 2,547,286 A * | 4/1951 | Sabin | 43/3 |
| 2,624,144 A * | 1/1953 | Beverman | 43/3 |
| 2,726,469 A * | 12/1955 | Becker | 43/3 |
| 4,422,257 A | 12/1983 | McCrory | |
| 4,535,560 A | 8/1985 | O'Neil | |
| 4,910,905 A * | 3/1990 | Girdley et al. | 43/3 |
| 5,074,071 A | 12/1991 | Dunne | |
| 6,079,140 A | 6/2000 | Brock | |
| 6,092,323 A | 7/2000 | McBride et al. | |
| 6,138,396 A * | 10/2000 | Capps | 43/3 |
| 6,442,885 B1 | 9/2002 | Payne | |
| 6,625,919 B1 | 9/2003 | Davis et al. | |
| 6,845,586 B1 | 1/2005 | Brock | |
| 7,043,865 B1 | 5/2006 | Crowe | |
| 7,788,840 B2 | 9/2010 | Wyant et al. | |
| 2002/0124453 A1 | 9/2002 | Payne | |
| 2003/0024146 A1 | 2/2003 | Spady et al. | |
| 2006/0143968 A1 | 7/2006 | Brint et al. | |
| 2009/0094877 A1 * | 4/2009 | Smith | 43/3 |

* cited by examiner

Primary Examiner — David Parsley
(74) Attorney, Agent, or Firm — Carrithers Law Office PLLC

(57) ABSTRACT

A decoy collapsible base and frame that floats with a portion thereof immersed in a body of water. A plurality of fowl shaped bodies defining duck decoys that float are detachably connected to the frame by tether lines. The tether lines are connected to a cam and a tether anchor moveably mounted on the frame. Rotation of the cam connecting to the tether lines pivots opposing duck decoys resulting in a dunking motion of selectively positioned duck decoys.

21 Claims, 4 Drawing Sheets

DECOY DUNKING APPARATUS

FIELD OF INVENTION

The present invention relates generally to decoys used to attract game waterfowl and more particularly a decoy support frame with selected floating characteristics and means for anchoring multiple fowl shaped decoy bodies to the frame in spaced apart relation and to a decoy having a partially submersible frame with a plurality of floating objects tethered to a submersible portion of the frame by tether lines.

BACKGROUND OF INVENTION

Decoys are used by hunters to attract waterfowl, such as ducks, in an attempt to bring them into shotgun shooting range. Decoys commonly employed are single fowl shaped bodies that float and usually tethered to stay in a general location.

DESCRIPTION OF PRIOR ART

U.S. Pat. No. 4,422,257 uses a carousel structure mounted above the water than can be seen by approaching game and creates an obstacle for ducks. U.S. Pat. No. 4,535,560 uses a complex underwater structure requiring multiple anchors and a remote power source requiring underwater installation. U.S. Pat. No. 6,625,919 teaches a decoy connected to a pivotally mounted transport arm and moving of the transport arm an decoy mounted thereon to a position along an arc between proximal and distal locations relative to the surface of the water. U.S. Patent Publication 20060143968 teaches a device for rotation of a decoy.

U.S. Pat. No. 6,845,586 teaches the use of a submersible frame and motor assembly for imparting motion to decoys using leads extending to decoys on the surface. U.S. Patent Publication 20030024146 teaches a plurality of decoys mounted on a frame extending from a central point. U.S. Pat. No. 6,442,885 teaches the use of a shaft having a plurality of arms and outer bearing tube rotatably attached to each arm at selected intervals and depths whereby rotation of a shaft results in movement of the decoys. U.S. Pat. No. 7,788,840 teaches an apparatus including a rotating support rod including pivoting decoy supports extending from a base suspended by a tether to an anchor. U.S. Pat. No. 7,043,865 teaches a floating decoy apparatus utilizing a rotating frame suspended at a selected depth by an anchor and including a powered movable decoy extending from an elevated central frame member.

U.S. Pat. No. 6,079,140 to Brock discloses a motion system for decoys comprising a frame suspended beneath the surface. The frame is suspended from a plurality of floating decoys by a guide wire or string, one end of which is tied to the front of each decoy and the other of which is tied to the frame. Also attached to the frame is a vertically mounted motor with the propellor oriented towards and parallel with the water surface. When activated, the motor drives the frame in a downward direction, thereby dragging the front portion of the decoys beneath the water surface to simulate a waterfowl in the feeding position. The principal disadvantage of Brock is that the device operates using an underwater motor. Underwater motors such as those used in Yerger and Brock are expensive to purchase and require routine maintenance due to the corrosion caused by long periods of submersion. Additionally, the Brock device is not capable of maintaining a continuous splashing and rippling action on the surface of the water, because once the Brock motor is activated, the frame is pushed away from the water surface and down towards the bottom of the water body. Furthermore, the character and amount of ripples and splashing cannot be controlled using the Brock device because it is difficult to alter the distance between the underwater motor and the water surface once the decoy system is deployed.

None of the prior art references provide a method which utilizes a cam mechanism to alternately dunk opposing duck decoys extending from arms or arms attached to a central frame as claimed in the instant invention.

SUMMARY OF INVENTION

The present invention provides for a dunking decoy apparatus consisting essentially of a frame including at least two opposing arms extending outwardly therefrom. Means on the frame are provided for causing the same to float in a body of water. A tether line anchor means is included which comprises a pitman extending from a pitman arm connecting to a shaft extending from the motor supported on the frame. A tether line extending from the folding arms extending from the frame. A tether line engages guide means extending along the arms from the pitman. The means for cooperatively and rotatably mounting the pitman include means defining pitman arms movably mounting the pitman with respect to the frame for movement along a predetermined path. Means connect an end of the individual tether lines to the pitman. Pulley means spaced apart from the pitman connect a decoy at a selected position for pivoting the decoy capable of floating in a body of water. Rotation of the pitman along the predetermined path shortens a tether line extending along a selected arm causing the decoy to pivot downward and simultaneously lengthens a tether line extending along the opposing arm releasing tension thereof and causing the decoy to pivot upward.

Moreover, in keeping with the foregoing there is provided in accordance with the present invention a frame for a game bird decoy and including floatation means, tether lines capable of being connected at one end thereof to game bird simulating bodies able to float in a body of water, tether line anchoring means defining a pitman and means movably mounting the tether line anchoring means on the frame for selected predetermined movement.

There is also provided in accordance with the present invention a game bird decoy comprising a frame including means causing the same to float in a body of water, a plurality of fowl shaped bodies each capable of floating on the surface of a body of water, individual tether lines connected at one end thereof to a respective one of the fowl shaped bodies and at the other end to a tether line anchor, and means mounting the tether line anchor on the frame for movement along a predetermined path.

More, particularly, a preferred embodiment of the present invention provides for a frame for a game bird decoy including means on the frame causing the same to float in a body of water, a plurality of individual tether lines on the frame, tether line engaging guide means on the frame, tether line anchor means, means movably mounting the tether line anchor means on the frame for movement along a predetermined path, means connecting an end of the individual tether lines to the anchor means and means spaced therefrom for connecting thereto game bird simulating bodies with such bodies being spaced apart from one another and capable of floating in a body of water. The float causing means comprises a selectively variable in volume member thereby allowing one to adjustably vary the buoyancy of the frame. The decoy frame also includes a central stationary portion or base having a plurality of arms together with means attaching the arms to the stationary portion. The arms are movable from one to the other of a first decoy storage position wherein they extend along the central frame portion and a second decoy operative position wherein they radiate outwardly. The arms are pivotally attached to the central frame portion. Means are provided to selectively operatively lock the arms in their second position. Moreover, the arms are adjustably variable in length. Furthermore, the tether line anchor of the decoy frame moves in a closed loop path. The present invention also includes a depth control means such as a float and more particularly an inflatable air bag and means captively retaining the same on a lower end of the central frame portion. Preferably the inflatable air bag is annular in shape.

A principal object is to provide a frame to which multiple floating fowl shaped objects can be anchored and maintained in spaced apart floating relation.

A further principal object is to provide a frame as in the forgoing that floats in a body of water with a selected portion thereof submersed in the body of water.

A further object is to provide adjustably variable buoyancy means on the frame.

A further object is to provide a decoy collapsible frame with fowl shaped bodies detachably connected thereto in predetermined spaced apart relation.

A still further object is to provide the foregoing decoy with means for controllably moving the floating fowl shaped bodies.

Other features and advantages of the invention will be apparent from the following description of the preferred embodiments thereof, and from the claims.

BRIEF DESCRIPTION OF THE DRAWINGS

A better understanding of the present invention will be had upon reference to the following description in conjunction with the accompanying drawings in which like numerals refer to like parts throughout the several views and wherein.

DETAILED DESCRIPTION OF PREFERRED EMBODIMENT

Figure 1:
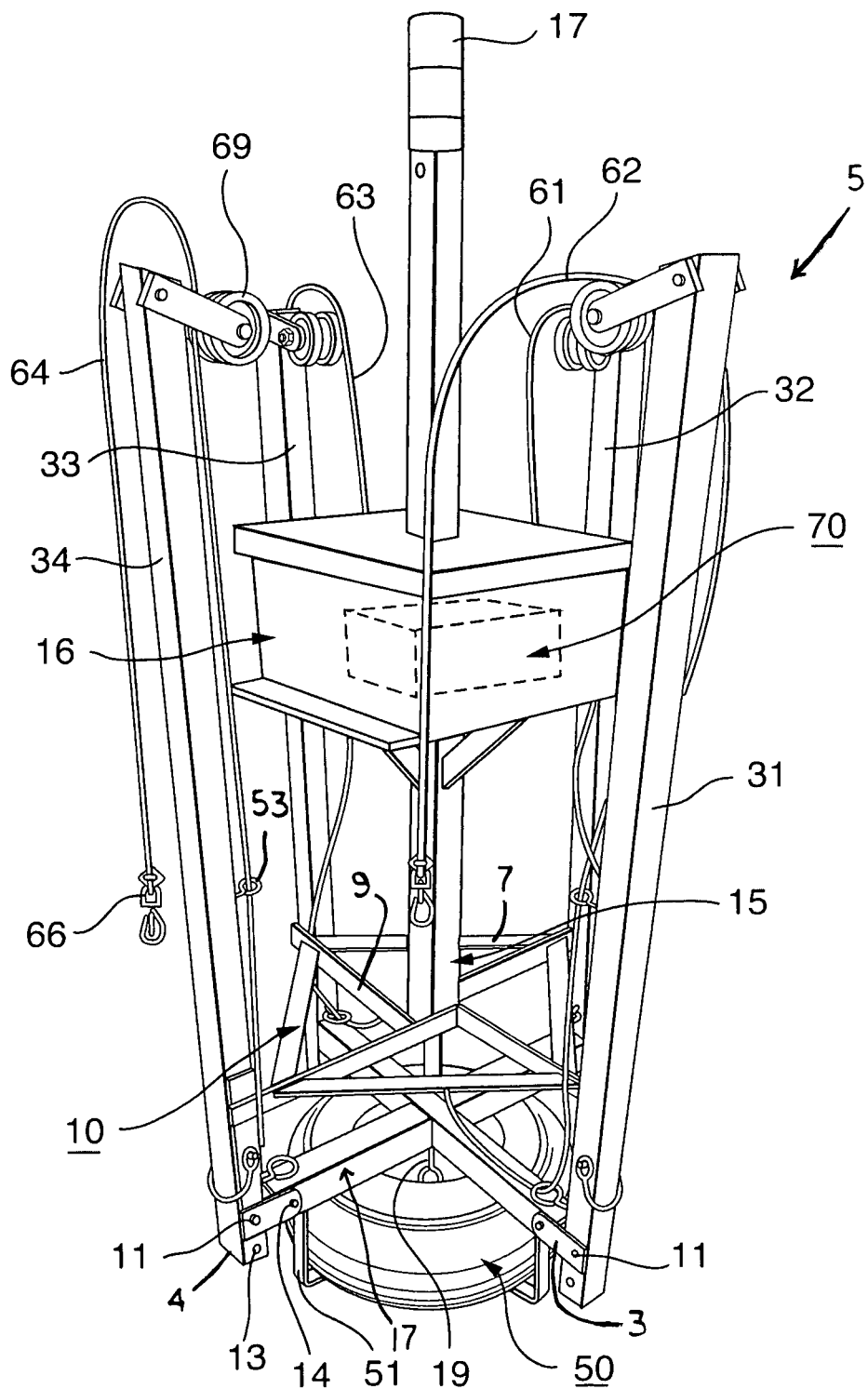
FIG. 1 is an oblique view of a duck decoy frame in its collapsed state.

As shown in the drawings, a the decoy apparatus 5 supports a plurality of game bird simulating bodies that float movably attached to a frame 10 including game bird shaped bodies, such as ducks, or geese attached thereto providing means for dunking floating decoys partially submerged in a body of water.

Figure 2:
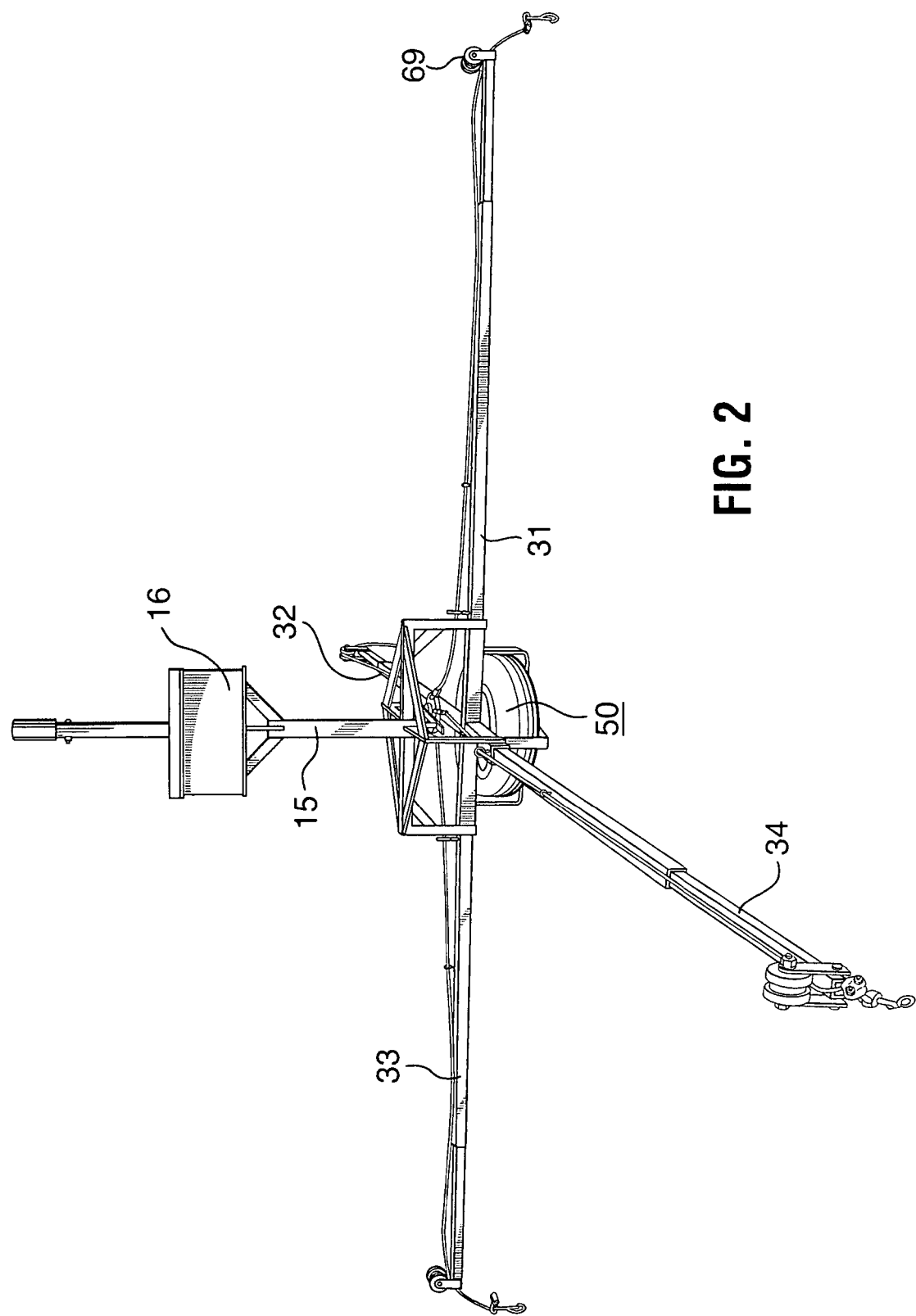
FIG. 2 is an oblique view of the frame in an opened operative state but on dry land.
Figure 3:
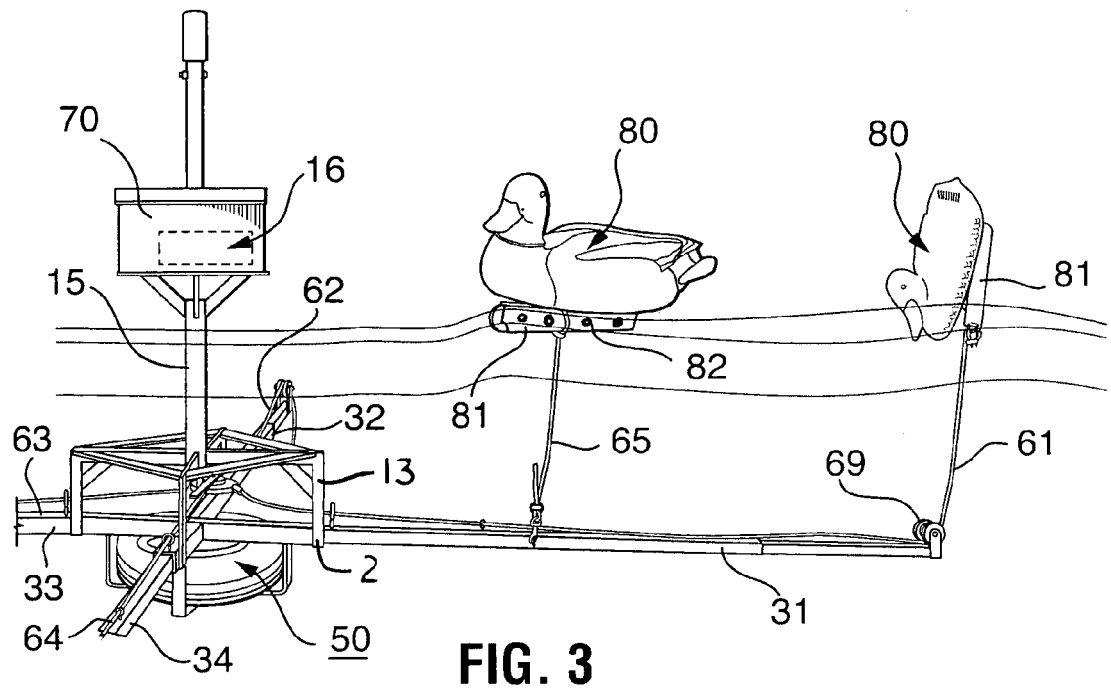
FIG. 3 is an oblique view, on a larger scale, of part of the lower portion of the frame showing the arms radiating outwardly and a few game bird shaped decoy bodies to tether lines attached to the frame.
Figure 5:
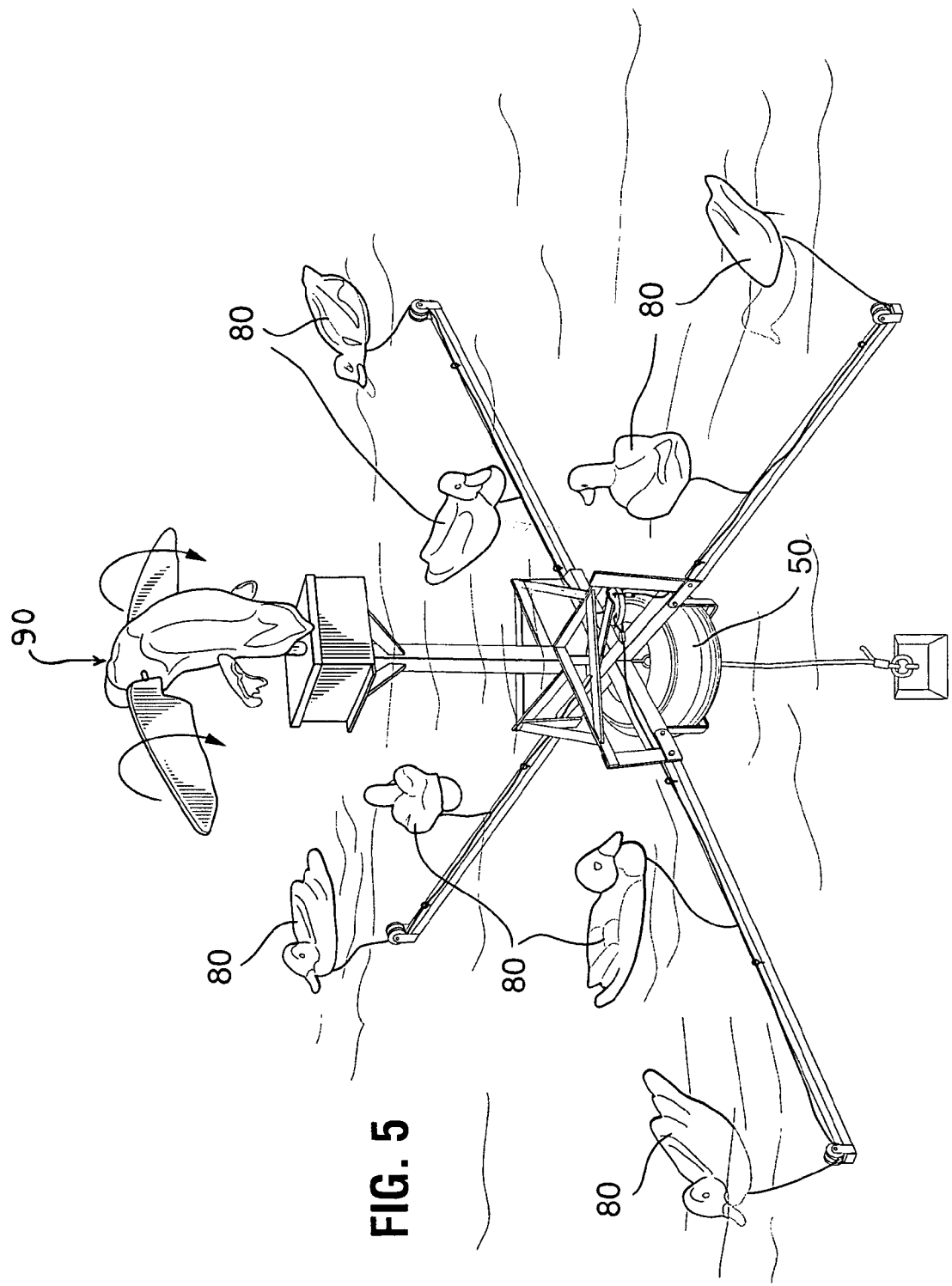
FIG. 5 is and oblique view showing the decoy in its environment use floating in a body of water.

More particularly, the decoy apparatus 5 comprises a box frame 10 including four arms 9 radiating from a central vertical tubular member 15 whereby the arms 9 form spokes having the distal ends connecting to longitudinal side members 7 at right angles forming a generally square planar box frame 10. Legs 13 extend downwardly from each corner of the planar box frame portion 10 and are reinforced by braces 21 connecting a midpoint of the legs 13 with a midpoint of the arms 9. The bottom distal ends 2 of the vertical legs 13 connect to the corresponding distal ends of the arms 23 of a cross member 17 which is positioned below and spaced apart from and aligned with the planar box frame 10. The distal ends of the arms 23 include a vertically oriented yoke 3 for pivotally connecting to a point at or near the distal ends 4 of frame arms preferably defining folding arms 31, 32, 33, 34 disposed within the yoke 3 and pivotally attached thereto at the lower end portion thereof. The folding arms 31-34 may be a single fixed length element or variable in length as for example comprising two or more sections disposed in telescopic relation. Each folding arm is pivotally attached to the yoke 3 of the cross member 17 by a pivot pin 11 and is moveable from one to the other of a first vertical decoy frame storage state, (FIG. 1), in which the folding arms extend along the frame portion 10, and a second decoy usable horizontal state where the folding arms radiate outwardly as best shown in FIGS. 2, 3, and 5. A removable pin 12 locks a respective one of the folding arms in its radiating outwardly position by passing the pin through the holes 13 in the folding arms associated therewith that align with holes 14 in the arms 23 of the cross member 17.

The central box frame 10 includes means such as a pipe or collar affixed thereto for supporting a centrally disposed rotatable shaft 18. In one preferred embodiment, the central box frame 10 has a central hollow tubular member such as a post 15 comprising a pipe or as shown in the figures a tube having a square cross section which is centrally mounted to the proximate ends of the arms 9 of the planar box frame portion 10 by welding or other means of fixation. The means for supporting the rotatable shaft 18 shown in the preferred embodiment comprises a vertically positioned longitudinal member or post projecting upwardly from a top wall of the box frame 10 Mounted onto the post 15 is a pitman motor and control box 16 which extends upward from the planar frame 10 a selected distance to insure that the control box is not flooded or subjected to water.

A frame floatation device 50 is captively retained on the lower end or bottom of the cross member 17 by for example a plurality (four) 'L' shaped brackets 51. The brackets have one leg 52 thereof spaced apart from a selected distance and attached to the cross member frame 17 which projects downwardly therefrom curving, bending or otherwise angled inwardly toward the center of the cross member and extending under the flotation device 50. The flotation device 50 is an expandible inflatable air bag, in the form of a tire inner tube, which inherently provides means for varying its buoyancy simply by varying the inflation pressure and hence its volume. It is contemplated that one or more blocks of STYROFOAM or similar material could be utilized in the flotation device as well. The lower end of the cross member frame 17 has a holding means such as an eye bolt 19 secured thereto at the frames axis of weight symmetry, for use in connecting an anchor line to the frame and an anchoring means such as a stake or heavy object should it be needed and/or desired to retain the decoy apparatus 5 in a predetermined floating location in a body of water to prevent drift from wind or waves.

An operative decoy includes at least two opposing decoys and preferably a plurality of decoys such as for example duck shaped bodies 80 capable of floating in a body of water and tethered to the cross member frame 17 by a tether line system 60. The locomotion system includes tether lines 61, 62, 63 and 64 associated with respective folding arms 31, 32, 33, 34 and each one supporting at least one subline 65 attached thereto by eyelets 53 whereby the sublines extend past the distal end of the arms. Each tether and subline has a connector 66 (snap fastener) attached to the free outer end thereof and operative for detachable connection to a decoy body associated therewith. Known decoy bodies are readily available that can be attached or readily modified for attachment for example by mounting thereon a receptive connector piece 81.

The tether line connects to the lower body portion of the fowl shaped body at a position located below the water surface during usage of the decoy. Connection to the fowl shaped bodies at the outer end of the arms is located at a position near a frontal end portion of the fowl shaped body so that when the tether line thereto is pulled the head of the foul gets pulled toward or under the surface of the water. Simultaneously with that movement the tail rises upwardly thereby simulating a fowl catching food below the surface. On the bottom of the body there is a keel like blade 82 to which the tether line can be connected in a selected one of two or more holes spaced from one another longitudinally along the blade.

Figure 4:
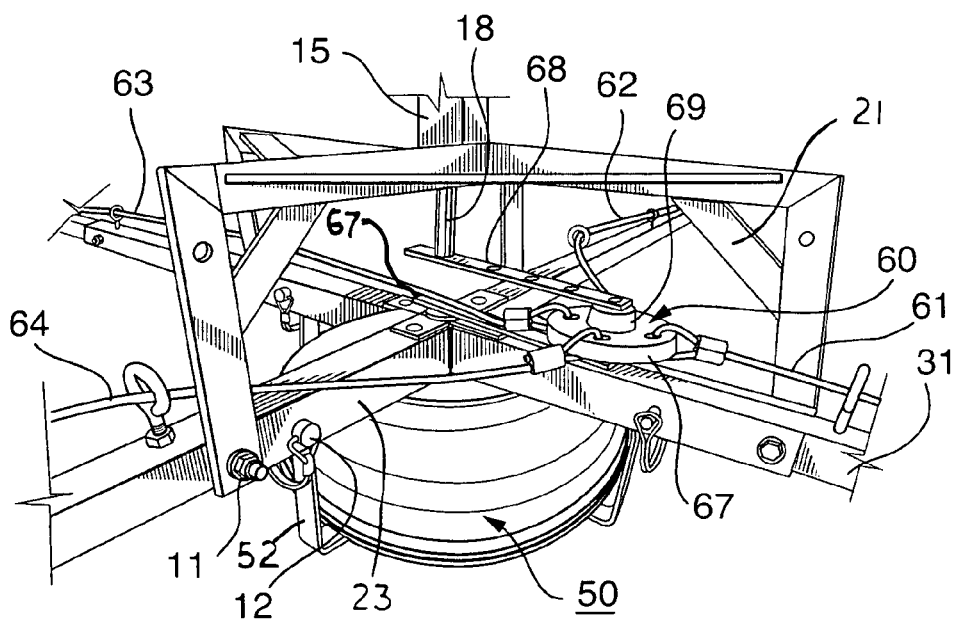
FIG. 4 is a partial view of a lower end portion of the decoy supporting frame.

The tether line system 60 has a tether line pitman 69 that is moveably mounted to the planar box frame 10 and the cross member frame 17. The pitman 69 comprises a disc, plate, or multi-arm like member having a central mounting bore with optional bearing and a plurality of tether line attachment apertures spaced opposing one another around the periphery of the pitman 69. The pitman 69 is pivotally attached between a pair of pitman arms 67, 68 by a pin or bolt that projects into a selected one of a series of apertures spaced apart from one another longitudinally along the pitman drive arms 67, 68. As shown best in FIG. 4, a top drive arm 68 having a hole in its proximate end is rotatably mounted to and radiates outwardly from the lower end of pitman shaft 18 that extends downwardly from the planar box frame 10 rotatably supported by the tubular post 15. A corresponding bottom drive arm 67 spaced apart from and in alignment with the top arm 68 includes a hole in the proximate end for rotatably mounting onto a short shaft, bolt, or spindle extending upwardly from the center of the cross member 17. The shaft 18 is supported within the post 15 by an end thrust friction reducing bearing or the like and is driven by a pitman motor drive system 70, for example such as a battery powered pitman gear motor attached to the motor shaft 18 which is connected to the pitman arms 67, 68 by bolts or screws. The pitman motor drive system is readily constructed by anyone skilled in the art and is therefore illustrated only by way of example by broken line in FIG. 1 and includes a battery power source for the motor and control means such as remote control receiver with corresponding remote and/or manual power off and on switches.

Each tether line 61, 62, 63, 64 has the end thereof, opposite to the decoy connectable end, connected to the tether line anchor piece 67. The tether lines pass through guides on the frame, for example eye-bolts secured to the frame and located at suitable locations, as well as a friction reducing guide, such as pulley 69, located near the free outer end on a respective one of folding arms 31-34. The shaft 18 can be rotated, oscillated, or driven intermittently about its longitudinal axis by the drive system rotating the pitman arms in a circle and thereby causing the tether lines to shorten and pull or lengthen and release tension on the floating fowl shaped bodies. Flotation characteristics of the fowl shaped bodies, placement of the tether line connections thereto and degree of movement of the tether lines determines the movement of the fowl shaped bodies as they float in the water.

In preparation for use as a decoy the folding arms can be pivoted to their operative state shown in 2, 3 and 4, for example, radiating outwardly from the lower end of the frame portion 10 and locked in that position. Decoy duck shaped bodies 80, capable of floating, are attached to the outer free end of the tether lines as well any subtether lines. Attachment of a tether line to a front portion of the decoy support 81 pulls the front portion of the decoy downward into the water resulting in a dunking action demonstrated by the decoy upon the pitman extending in the opposite direction of the decoy and simultaneously relaxing tension on the opposing tether line resulting in extension of the line to the decoy with the result that the decoy's hear rises. Thus, opposing tether lines work in a synchronized motion to pull a decoy's head down on one side of the pitman and release the decoy's head to raise up on the opposite side of the pitman.

Flotation of the frame is such, or adjusted if necessary to be such, that the folding arms, tether lines, tether line anchor means and controllable floatation means will be submersed in the body of water. During usage the floating fowl shaped bodies anchored to the frame assist in stabilizing the frame as it floats in a body of water. Additional decoys can be suspended from lines positioned at selected points along the extendable folding arms providing an additional attraction and supplemental float means.

As an option, as shown in the figures, the post 15 extending from the planar box frame 10 to support the control box and motor assembly 16 can be extended vertically to support an additional decoy 90. A fowl shaped body can be mounted on the post having the terminal end 17 and it maybe of the type where the wings can move, or caused to be moved, to simulate for example a duck in flight. Decoys of this nature are known and by way of example reference maybe had to U.S. Pat. No. 6,092,323 granted Jul. 25, 2000 to C. M. McBride et al. for a "Duck Decoy" having motorized wings which provide the decoy with the appearance of a duck in perpetual stationary flight above a water body and which is incorporated by reference herein.

Modifications

Specific methods, or embodiments discussed are intended to be only illustrative of the invention disclosed by this specification. Variation on these methods, or embodiments are readily apparent to a person of skill in the art based upon the teachings of this specification and are therefore intended to be included as part of the inventions disclosed herein.

Reference to documents made in the specification is intended to result in such patents or literature cited are expressly incorporated herein by reference, including any patents or other literature references cited within such documents as if fully set forth in this specification.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

We claim:

1. A dunking decoy apparatus, comprising:
    a frame including an upper frame portion extending above a surface of a body of water and a lower frame portion extending below the surface of said body of water, said frame including at least two opposing arms extending outwardly from a base of said lower frame portion:
    float means on said frame supporting said base causing the same to float in said body of water at a selected depth;
    an anchor extending from said frame below said base and attaching to said frame by a line at a selected position, said anchor resting on the bottom surface of said body of water and holding said apparatus at a selected stationary position;

an electric motor supported on said frame at a selected position above the surface of said body of water including a shaft extending from said motor in cooperative engagement with a pitman arm rotatably connecting thereto;

a pitman connecting to said pitman arm in rotational communication with said pitman arm and said motor;

a tether line attaching to a selected attachment point of said pitman extending along each one of said at least two arms extending from said frame;

a tether line guide means extending from each one of said at least two arms;

means movably mounting said tether line pitman on said frame for movement along a predetermined path;

at least a floatable first decoy and a floatable second decoy attaching to a distal end of each opposing tether line;

said rotation of said pitman arm in a circulation motion creating in a cam action decreasing the length of said tether line causing at least a portion of said floatable first decoy to be submerged and simultaneously increasing the length of the opposing tether line causing at least a portion of said floatable second decoy to surface.

2. The decoy dunking apparatus as defined in claim 1 wherein said float is selectively variable in volume thereby allowing one to adjustably vary the buoyancy of the frame.

3. The decoy dunking apparatus as defined in claim 2 said base including a central stationary portion, a plurality of arms and means attaching said arms to said stationary portion, said arms being movable from one to the other of a first decoy storage position wherein they extend along the central frame portion and a second decoy operative position wherein they radiate outwardly.

4. The decoy dunking apparatus as defined in claim 3 wherein said arms are pivotally attached to said central frame portion.

5. The decoy dunking apparatus as defined in claim 4 including means selectively operatively locking said arms in their second position.

6. The decoy dunking apparatus as defined in claim 1 said arms are adjustably variable in length.

7. The decoy dunking apparatus as defined in claim 1 wherein said pitman in a selected closed loop path.

8. The decoy dunking apparatus as defined in claim 3 wherein said float comprise an inflatable air bag and means captively retaining the same on a lower end of the central frame portion.

9. The decoy dunking apparatus as defined in claim 1 including a powered movable decoy extending from an elevated central frame member in cooperative engagement with said motor.

10. The decoy dunking apparatus of claim 1, said floatable decoy including an attachment point at a forward position, wherein rotation of said cam decreasing the length of said tether line creates a dunking motion of said floatable decoy.

11. A dunking decoy apparatus, comprising:
a frame including an upper frame portion extending above a surface of the water and a lower frame portion extending below the surface of the water including at least two opposing arms extending outwardly therefrom below the surface of the water;
an anchor extending from said frame below said base and attaching to said frame by a line at a selected position, said anchor resting on the bottom surface of said body of water and holding said frame at a selected stationary position;
float means on said frame causing the same to float in a body of water at a selected depth;
an electric motor supported on said upper frame portion including means for cooperatively and rotatably engaging a pitman projecting below the surface of the water from a shaft from extending from said motor;
a tether line extending from said pitman along at least two opposing arms extending from said frame;
a tether line guide means extending along said arms from said pitman;
said pitman rotating with respect to said frame for movement along a predetermined path;
means connecting an end of said individual tether lines to said pitman;
a decoy attaching to a distal end of said tether line opposite said pitman at a selected position for pivoting said decoy capable of floating in a body of water; and
whereby rotation of said pitman along said predetermined path shortens a tether line extending along a selected arm causing said decoy to pivot downward and simultaneously lengthens a tether line extending along said opposing arm releasing tension thereof and causing said decoy to pivot upward.

12. The dunking decoy apparatus of claim 11, wherein said means for cooperatively and rotatably said pitman including means movably mounting said pitman with respect to said frame for movement along a predetermined path comprises at least one pitman arm extending from a shaft of said motor cooperatively engaging said pitman.

13. The decoy dunking apparatus as defined in claim 11 wherein said float causing means comprises a selectively variable in volume member thereby allowing one to adjustably vary the buoyancy of the frame.

14. The decoy dunking apparatus as defined in claim 11 including a central stationary portion, defining a base having a plurality of arms and means attaching said arms to said stationary portion, said arms being movable from one to the other of a first decoy storage position wherein they extend along the central frame portion and a second decoy operative position wherein they radiate outwardly.

15. The decoy frame as defined in claim 11 wherein said arms are pivotally attached to said central frame portion.

16. The decoy dunking apparatus as defined in claim 11 said arms are adjustably variable in length.

17. The decoy dunking apparatus as defined in claim 11 wherein said pitman moves in a selected closed loop path.

18. The decoy dunking apparatus as defined in claim 11 wherein said variable in volume member comprise an inflatable air bag and means captively retaining the same on a lower end of the central frame portion.

19. The decoy dunking apparatus as defined in claim 11 including a powered movable decoy extending from an elevated central frame member in cooperative engagement with said motor.

20. The decoy dunking apparatus as defined in claim 11 wherein said frame further comprises a central stationary portion and said at least two arms includes means attaching said arms to a lower end portion of said stationary portion, said arms being movable from one to the other of a first decoy vertical storage position extending along the central frame portion and a second decoy operative position radiating outwardly therefrom.

21. The decoy dunking apparatus of claim 11, said floatable decoy including an attachment point at a forward position, wherein rotation of said cam decreasing the length of said tether line creates a dunking motion of said floatable decoy.

* * * * *